(12) United States Patent
Toyomura et al.

(10) Patent No.: US 12,308,701 B2
(45) Date of Patent: May 20, 2025

(54) MOTOR

(71) Applicant: MINEBEA MITSUMI Inc., Nagano (JP)

(72) Inventors: Naoto Toyomura, Kitasaku-gun (JP); Takuji Yamada, Kitasaku-gun (JP)

(73) Assignee: MINEBEA MITSUMI Inc., Nagano (JP)

( * ) Notice: Subject to any disclaimer, the term of this patent is extended or adjusted under 35 U.S.C. 154(b) by 281 days.

(21) Appl. No.: 17/662,096

(22) Filed: May 5, 2022

(65) Prior Publication Data

US 2022/0368178 A1 Nov. 17, 2022

(30) Foreign Application Priority Data

May 12, 2021 (JP) .................................. 2021-081210

(51) Int. Cl.
*H02K 1/17* (2006.01)
*H02K 3/28* (2006.01)

(52) U.S. Cl.
CPC .................. *H02K 1/17* (2013.01); *H02K 3/28* (2013.01)

(58) Field of Classification Search
CPC .......... H02K 1/17; H02K 3/28; H02K 1/2786; H02K 1/2706; H02K 3/522; H02K 3/18; H02K 2203/06
USPC ....................................................... 310/309
See application file for complete search history.

(56) References Cited

U.S. PATENT DOCUMENTS

| 6,127,760 | A | * | 10/2000 | Nagasaki | ............... | H02K 3/522 |
| | | | | | | 310/216.049 |
| 9,876,409 | B2 | | 1/2018 | Kajiyama | | |
| 10,574,111 | B2 | | 2/2020 | Kitamura et al. | | |
| 2009/0128075 | A1 | * | 5/2009 | Hiwaki | .................. | H02K 29/08 |
| | | | | | | 318/400.38 |

(Continued)

FOREIGN PATENT DOCUMENTS

| JP | 2000-166193 A | 6/2000 |
| JP | 2009-033873 A | 2/2009 |

(Continued)

OTHER PUBLICATIONS

Notice of Reasons for Refusal dated Oct. 16, 2024 for corresponding Japanese Application No. 2021-081210 and English translation.

*Primary Examiner* — Terrance L Kenerly
*Assistant Examiner* — Theodore L Perkins
(74) *Attorney, Agent, or Firm* — Chrisman Gallo Tochtrop LLC

(57) ABSTRACT

A motor includes a stator and a substrate. The stator includes a plurality of magnetic bodies and a coil wound around each of the magnetic bodies. The substrate opposes the stator in the rotational axis direction. The coil includes a first layer and a second layer stacked on the first layer. $1 \leq D/L$ holds, where L is a thickness of the magnetic body in the rotational axis direction and D is a width of the magnetic body in a radial direction. In the radial direction, a conducting wire of the first layer and a conducting wire of the second layer making up an inner edge of the coil are in contact with each other, and, in the radial direction, a conducting wire of the first layer and a conducting wire of the second layer making up an outer edge of the coil are in contact with each other.

9 Claims, 10 Drawing Sheets

(56) References Cited

U.S. PATENT DOCUMENTS

| | | | |
|---|---|---|---|
| 2013/0162072 A1* | 6/2013 | Mizutani | H02K 3/345 |
| | | | 310/71 |
| 2013/0200739 A1* | 8/2013 | Lee | H02K 1/278 |
| | | | 310/156.01 |
| 2014/0312745 A1* | 10/2014 | Nicoloff | H02K 1/17 |
| | | | 310/67 R |
| 2015/0180301 A1 | 6/2015 | Kajiyama | |
| 2017/0025974 A1* | 1/2017 | Phan | H02K 29/08 |
| 2018/0226852 A1* | 8/2018 | Kitamura | H02K 3/12 |

FOREIGN PATENT DOCUMENTS

| | | |
|---|---|---|
| JP | 2009-060693 A | 3/2009 |
| JP | 2015-122854 A | 7/2015 |
| JP | 2020-025417 A | 2/2020 |
| WO | 2017/072912 A1 | 5/2017 |

* cited by examiner

MOTOR

CROSS-REFERENCE TO RELATED APPLICATIONS

This application claims the benefit of Japanese Application No. 2021-081210, filed May 12, 2021, the entire disclosure of which is hereby incorporated herein by reference.

TECHNICAL FIELD

The present invention relates to a motor.

BACKGROUND ART

So-called flat motors are known. In the flat motor, the length of a stator core in the radial direction is larger than the length of the stator core in the axial direction. In the flat motor, a connecting member such as a substrate is disposed near the stator of the motor.

CITATION LIST

Patent Literature

Patent Document 1: JP 2009-033873 A
Patent Document 2: JP 2000-166193 A

SUMMARY OF INVENTION

Technical Problem

In the flat motor, the length of the motor in the axial direction is required to be reduced, while it is preferable to enable the stator core to have the height (stack length) in the axial direction in order to suppress the saturation of the magnetic flux and increase the torque.

An object of an aspect is to provide a motor capable of reducing the length in the axial direction.

Solution to Problem

In one aspect, a motor includes a stator and a substrate. The stator includes a plurality of magnetic bodies disposed side by side in a circumferential direction and a coil wound around each of the plurality of magnetic bodies. The substrate opposes the stator in a rotational axis direction. The coil includes a first layer and a second layer stacked on the first layer. $1 \leq D/L$ holds, where L is a thickness of the magnetic body in the rotational axis direction and D is a width the magnetic body in a radial direction. The second layer is a layer remotest from the magnetic body. In the radial direction, a conducting wire of the first layer and a conducting wire of the second layer making up an inner edge of the coil are in contact with each other, and, in the radial direction, a conducting wire of the first layer and a conducting wire of the second layer making up an outer edge of the coil are in contact with each other.

According to one aspect, the length in the axial direction can be reduced.

DESCRIPTION OF EMBODIMENTS

Figure 1:
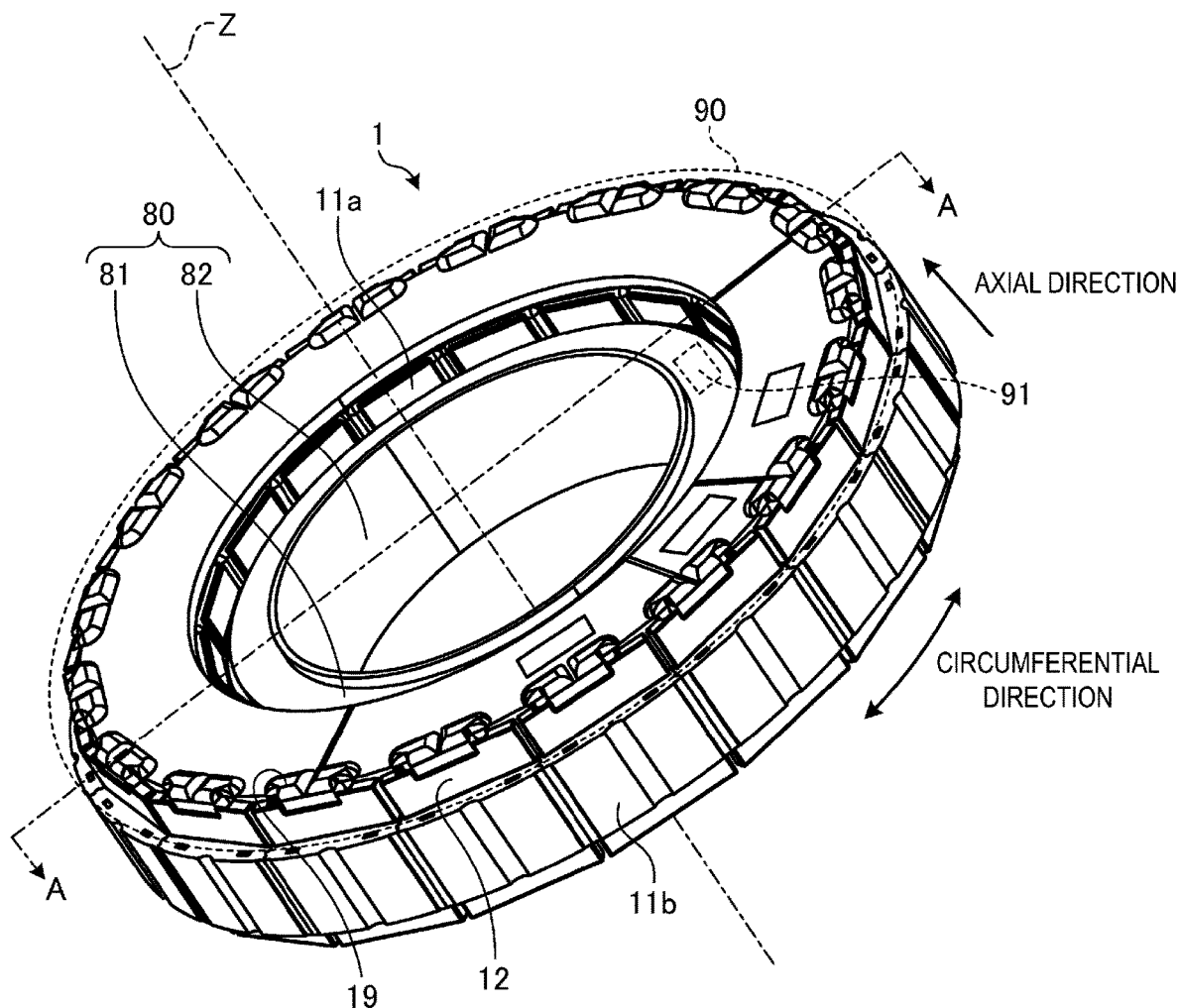
FIG. 1 is a perspective view illustrating an example of a motor of an embodiment.

An embodiment of a motor disclosed in the present application will be elaborated below with reference to the drawings. Note that the present invention is not limited by the following embodiment. In addition, the dimensional relationships between elements and the ratios of the elements in the drawings may differ from the actual configuration. Some parts may differ from each other in dimensional relationships and ratios between the drawings. For example, in following FIG. 2 and the like, the shape of a wall part 122 of an insulator 12 described later differs from the shape illustrated in FIG. 1 and the like. In addition, in principle, the content described in one embodiment or modification is applied also to other embodiments and modifications.

Note that in the following description, for convenience, the axial direction in the illustration is a rotational axis direction of the motor of the present embodiment. In the axial direction, one direction (upward direction) is a first direction, and the other direction (downward direction) is a second direction. The radial direction illustrated in the drawing is the radial direction orthogonal to the rotational axis direction of the motor of the present embodiment. In the radial direction, a direction away from a rotational axis Z described later is the outside in the radial direction, and the direction toward the rotational axis Z is the inside in the radial direction. The circumferential direction illustrated in the drawing is a direction coinciding with the rotational direction of the motor of the present embodiment. In each drawing, a coordinate axis including at least one of the axial direction, the radial direction and the circumferential direction may be illustrated for the sake of the ease of description. In addition, in the coordinate axis, the direction toward the outside in the radial direction may be the positive direction.

Embodiments

Figure 2:
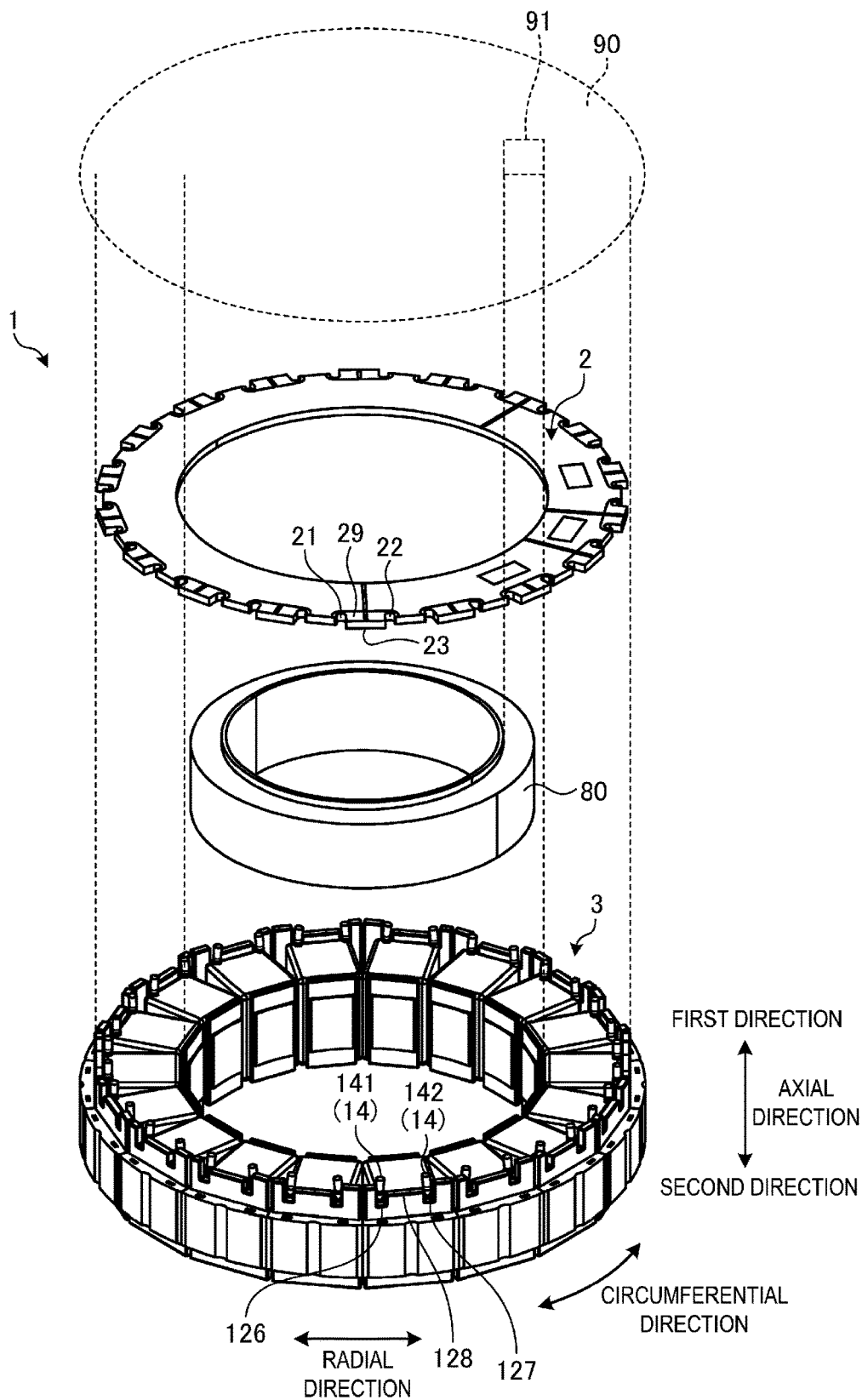
FIG. 2 is an exploded perspective view illustrating an example of the motor of the embodiment.
Figure 3:
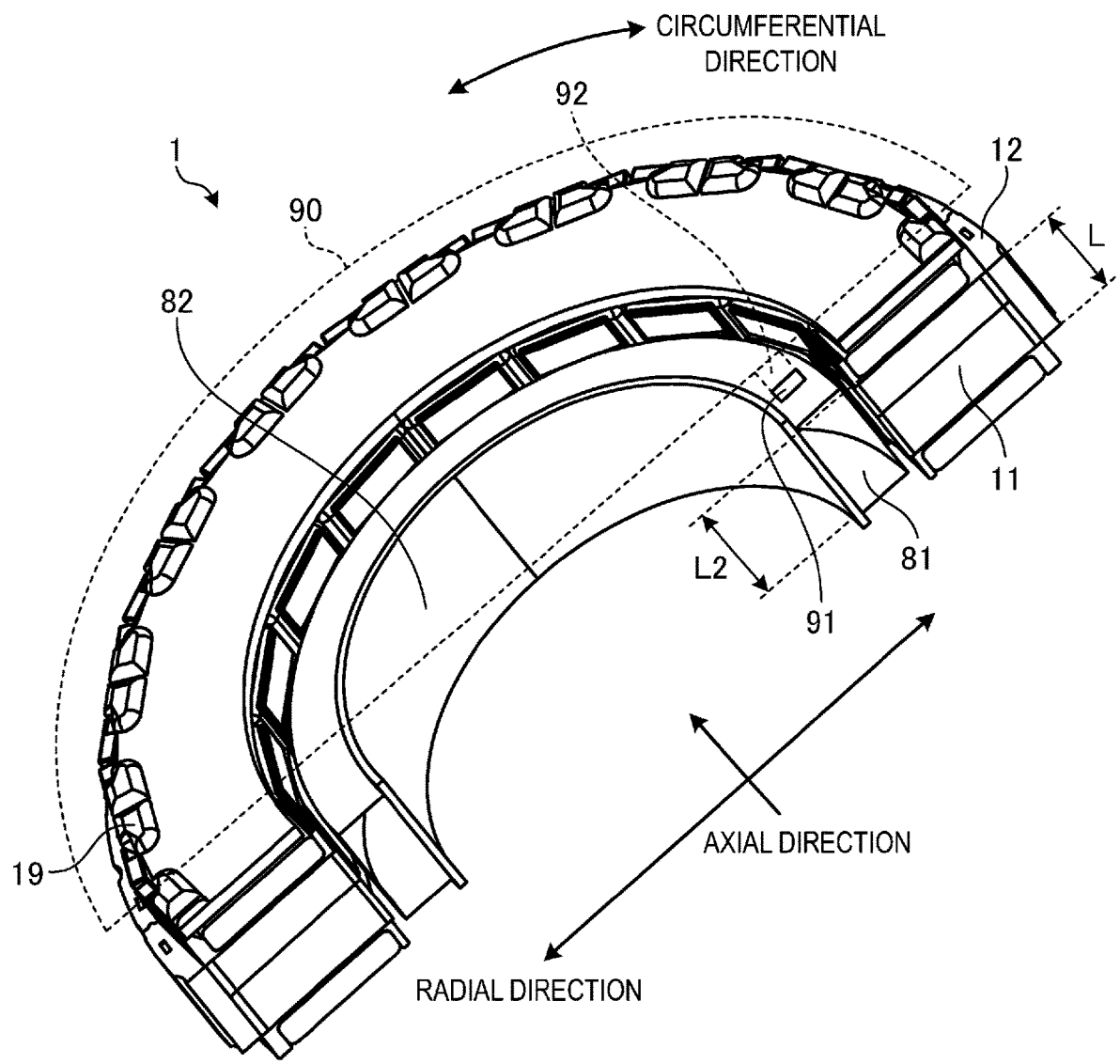
FIG. 3 is a cross-sectional perspective view illustrating an example of the motor of the embodiment.
Figure 4:
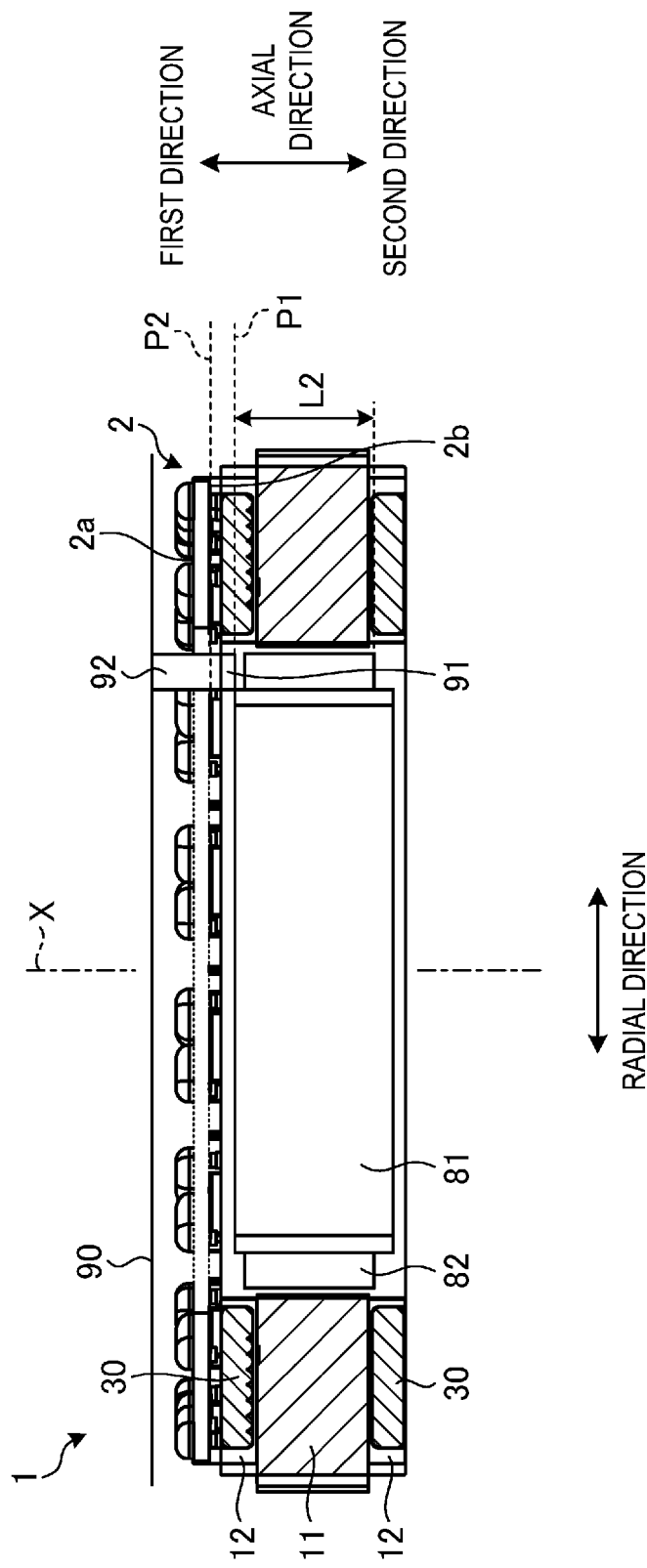
FIG. 4 is a side sectional view illustrating an example of the motor of the embodiment.

First, a motor of an embodiment will be described with reference to FIG. 1 to FIG. 4. FIG. 1 is a perspective view illustrating an example of the motor of the embodiment. FIG. 2 is an exploded perspective view illustrating an example of the motor of the embodiment. FIG. 3 is a cross-sectional perspective view illustrating an example of the motor of the embodiment. FIG. 4 is a side sectional view illustrating an example of the motor of the embodiment. FIG. 3 and FIG. 4 illustrate cross sections taken along line A-A of FIG. 1.

As illustrated in FIG. 1 to FIG. 4, a motor 1 of the embodiment includes a substrate 2, a stator 3, a rotor 80, and a housing 90. Note that in the following description, the illustration of the parts other than the lid part of the housing 90 may be omitted. The motor 1 of the present embodiment is, for example, an inner rotor type brushless motor.

The stator 3 illustrated in FIG. 1 is disposed to surround the rotor 80. The motor 1 of the present embodiment employs a so-called split core. The stator 3 of the present embodiment includes a plurality of split cores 10 described later. In the stator 3, the plurality of split cores 10 are disposed along the circumferential direction in an annular pattern, and the split cores 10 adjacent to each other are bonded to be integrated with each other. The plurality of split cores 10 are, for example, disposed along the circumferential direction in an annular pattern. Each split core 10 is integrally shaped by insert molding, for example.

As illustrated in FIG. 4, the stator 3 includes a stator core 11, the insulator 12, and a coil 30. Note that the stator core 11 is an example of a magnetic body. The coil 30 is formed by winding a conducting wire 14 around the stator 3 via the insulator 12. As illustrated in FIG. 2, a first end part 141 and a second end part 142 of the conducting wire 14 are drawn from the coil 30 in the same direction (the first direction) as draw wires. The stator core 11, the insulator 12 and the coil 30 will be elaborated later.

As illustrated in FIG. 2, in the stator 3, the substrate 2 formed into an annular shape to oppose the stator 3 in the axial direction is disposed at the first direction side of the axial direction. The substrate 2 is formed of a resin material with an insulation property such as epoxy. The substrate 2 includes two surfaces 2a and 2b. An electronic component (not illustrated in the drawing) is disposed at the substrate 2. Examples of the electronic component include a capacitor, a resistor, an inverter, and an IC. As illustrated in FIG. 4, the substrate 2 is disposed and supported at the stator 3 directly or via another member, with the surface 2b opposing the stator 3 in the axial direction, for example. Note that the substrate 2 may be disposed and supported at the housing 90.

As illustrated in FIG. 2, the substrate 2 includes a plurality of recess parts 21 and 22 recessed from the outer peripheral end toward the inside in the radial direction. The plurality of recess parts 21 and 22 are adjacent to each other in the circumferential direction. In the following description, the recess part 21 may be referred to as a first recess part 21 or a substrate side first recess part 21, and the recess part 22 may be referred to as a second recess part 22 or a substrate side second recess part 22. In the present embodiment, a land 29 is formed at the surface 2a of the substrate 2. In addition, in the circumferential direction, a substrate protrusion part 23 as a protrusion part is formed between the substrate side first recess part 21 and the substrate side second recess part 22. The substrate protrusion part 23 is formed to protrude to the outside in the radial direction from the outer periphery of in the substrate 2.

The land 29 is a connecting part formed of a conductive member and connected to the conducting wire 14. As described later, the first end part 141 and the second end part 142 of the conducting wire 14 drawn from the coil 30 are physically and electrically connected to the land 29 by a solder 19 being an alloy illustrated in FIG. 1. Note that in FIG. 3 and FIG. 4, the land 29 is covered with the solder 19 and thus is invisible.

The rotor 80 is disposed inside the stator 3 in the radial direction. As illustrated in FIG. 3, the rotor 80 includes a rotor magnet 81 and a rotor core 82. The rotor magnet 81 is, for example, a tubular or cylindrical magnet fixed at the outer peripheral surface of the rotor core 82. The rotor magnet 81 is formed of a rare-earth magnet such as a neodymium magnet. The rotor core 82 is fixed at the outer peripheral surface of a shaft not illustrated in the drawing, for example.

In addition, as illustrated in FIG. 3 and FIG. 4, in the present embodiment, a height (the size in the axial direction) L2 of the rotor magnet 81 is formed to be greater than a height (the size in the axial direction) L of the stator core 11.

The housing 90 houses the substrate 2, the stator 3, and the rotor 80. The housing 90 includes the lid part, and an outer periphery part and a bottom part not illustrated in the drawing. As illustrated in FIG. 2, the lid part of the housing 90 covers a part or the entirety of the substrate 2 and the stator 3 in top view.

In addition, the housing 90 further includes a sensor 91 and a sensor holder 92. The sensor 91 detects at least one of the rotational speed and the rotation angle of the rotor 80 by detecting the magnetic flux of the rotor magnet 81. As illustrated in FIG. 4, the sensor holder 92 extends toward the second direction side from the second direction side surface of the housing 90 in the axial direction. The sensor 91 is disposed at the second direction side (the rotor 80 side) surface of the sensor holder 92. As illustrated in FIG. 2 to FIG. 4, in the axial direction, the sensor 91 is disposed apart from the rotor magnet 81 by a predetermined distance to oppose the rotor magnet 81. In addition, a position P1 of the sensor 91 in the axial direction is at the rotor 80 side, i.e., the second direction side in the axial direction relative to a position P2 in the axial direction in the substrate 2.

Figure 5:
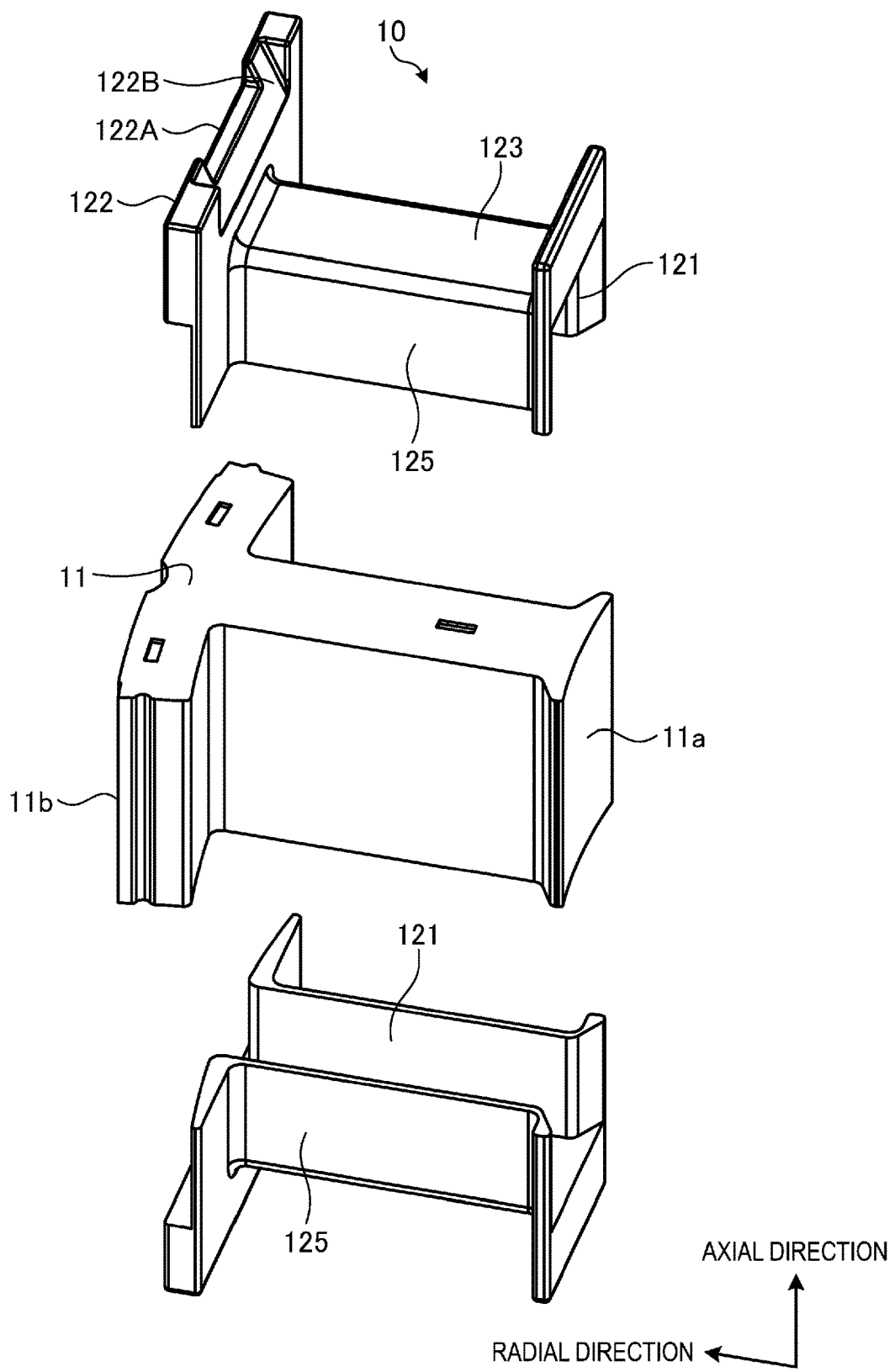
FIG. 5 is an exploded perspective view illustrating an example of a stator core of the embodiment.
Figure 6:
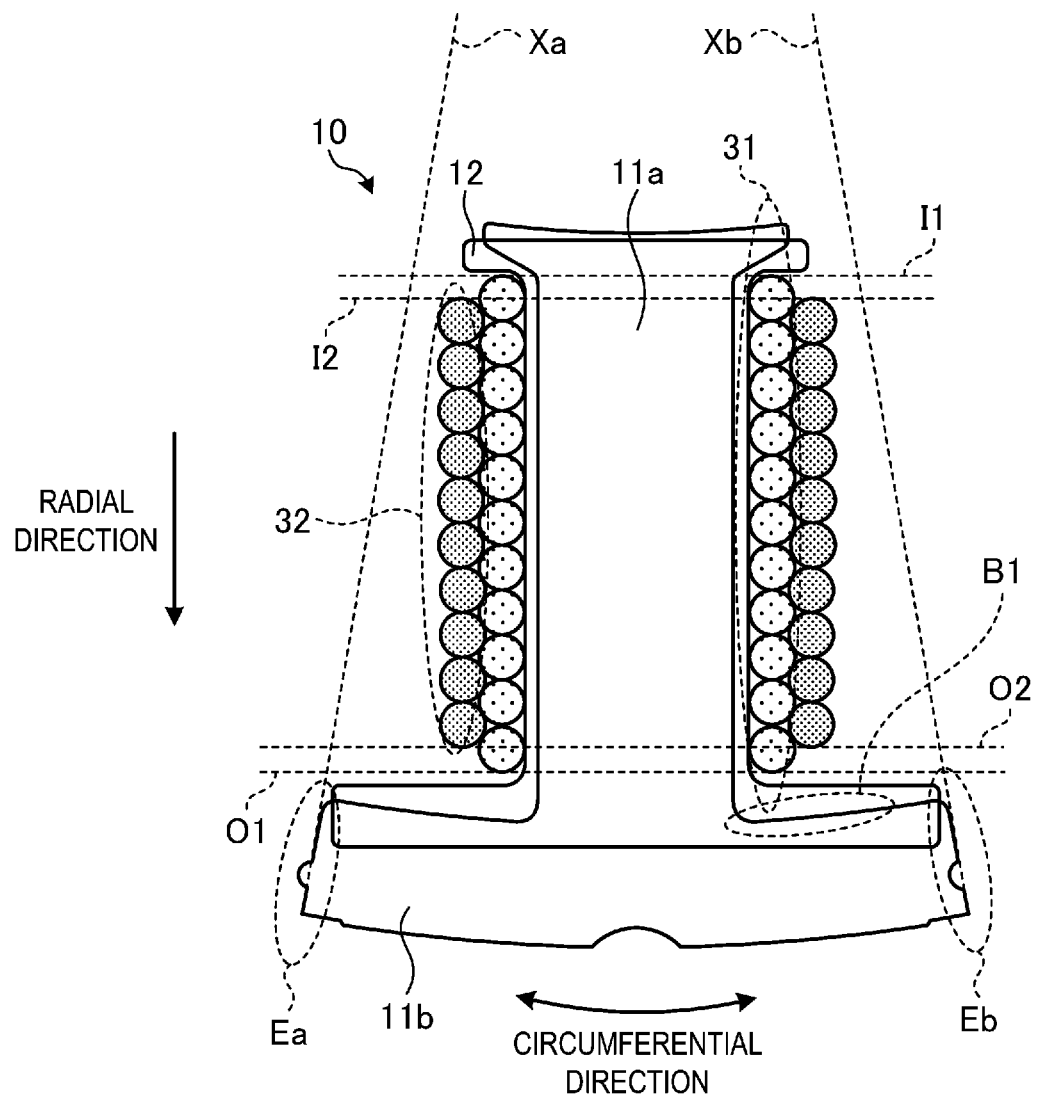
FIG. 6 is a sectional view illustrating an example of a stator core wound around with a coil in the embodiment.
Figure 7:
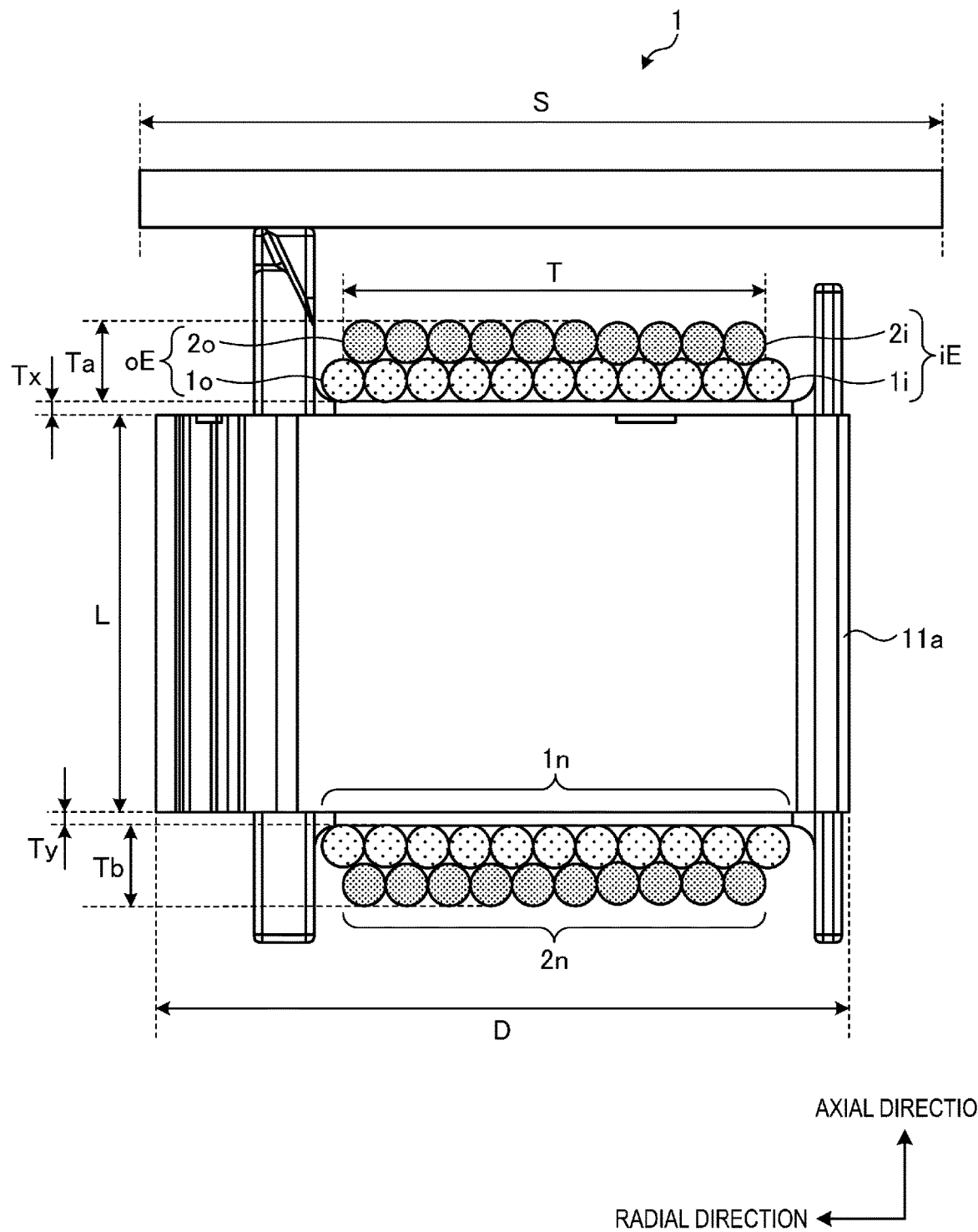
FIG. 7 is a side sectional view illustrating an example of the stator core wound around with the coil in the embodiment.
Figure 8:
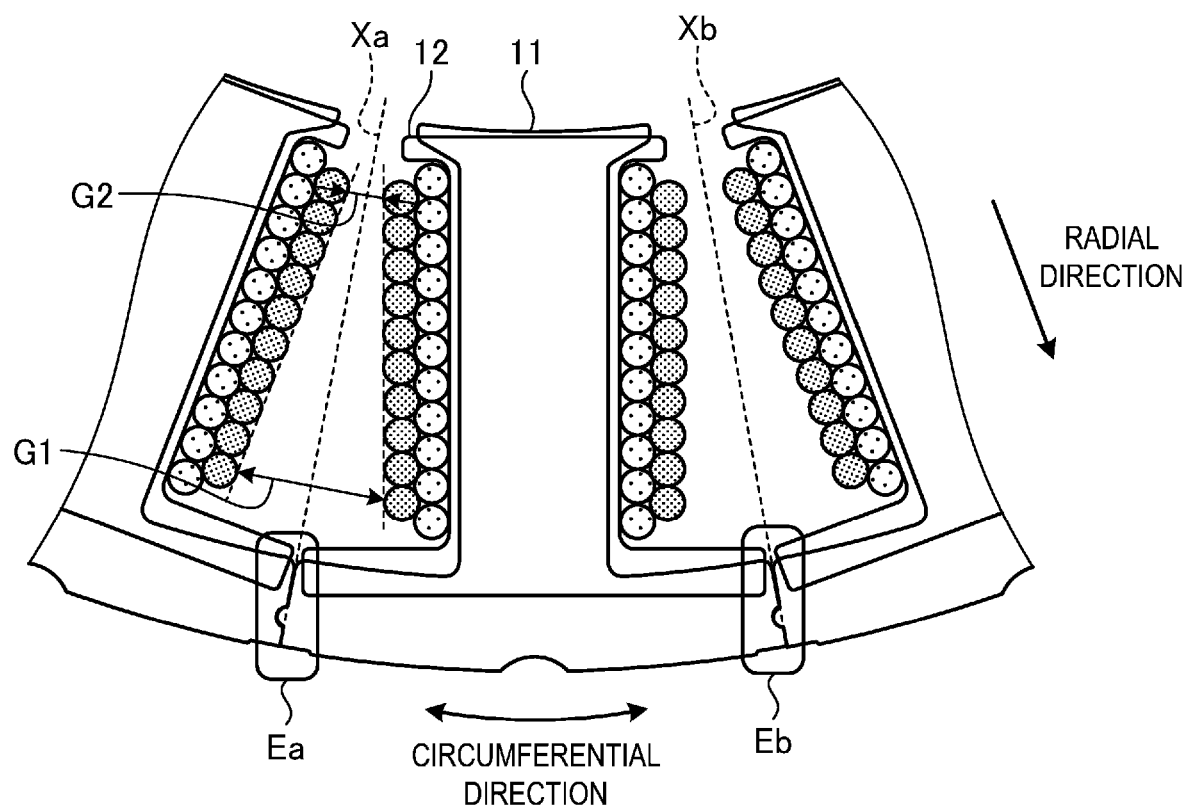
FIG. 8 is a sectional view illustrating an example of a stator of the embodiment.

Next, a configuration of each split core 10 will be described with reference to FIG. 5 to FIG. 8. FIG. 5 is an exploded perspective view illustrating an example of a stator core of the embodiment. FIG. 6 is a sectional view illustrating an example of a stator core wound around with a coil in the embodiment. FIG. 7 is a side sectional view illustrating an example of the stator core wound around with the coil in the embodiment. FIG. 8 is a sectional view illustrating an example of a stator of the embodiment. As illustrated in FIG. 5 to FIG. 8, each split core 10 includes the stator core 11, the insulator 12, and the coil 30. Note that in FIG. 5, the illustration of the coil 30 is omitted. In addition, in FIG. 7, the illustration of the conducting wire 14 drawn from the coil 30 as a draw wire is omitted.

The stator core 11 is a magnetic body having a layered structure obtained by layering a plurality of electromagnetic steel plates and the like in the axial direction, for example. A plurality of the stator cores 11 is disposed along the circumferential direction in an annular pattern. The stator core 11 includes a yoke 11b and a tooth 11a including a magnetic pole part opposing the rotor 80 as an end part. The tooth 11a extends from the inner surface of the yoke 11b toward the inside (the rotor 80 side) in the radial direction. As illustrated in FIG. 8, the yoke 11b is coupled with the adjacent yoke 11b in the circumferential direction, with the plurality of split cores 10 disposed along the circumferential direction in an annular pattern. Note that the yoke 11b is an example of the outer periphery part.

In the stator core 11 of the motor 1 being a so-called flat motor, the length (width) in the radial direction is formed to be greater than the height (thickness) in the axial direction. In the present embodiment, as illustrated in FIG. 7, a ratio (D/L) of a width D of the stator core 11 in the radial direction to a thickness L of the stator core 11 in the axial direction is greater than 1. Further, preferably, D/L is greater than 4.5. Note that the thickness L of the stator core 11 in the present embodiment is, for example, 20 mm or smaller.

The insulator 12 is formed of an insulator such as resin, and interposed between the stator core 11 and the coil 30 to electrically insulate the coil 30 and the stator core 11, for example. As illustrated in FIG. 5, the insulator 12 includes a housing part 121 housing the stator core 11 inside, the wall part 122 formed at an end part at the outside in the radial direction of the housing part 121, a top surface 123 formed at both end parts at the outside in the axial direction of the housing part 121, and a side surface 125 formed at both end parts of the housing part 121 in the circumferential direction. The insulator 12 is formed to be dividable into two parts, and can house the stator core 11 inside in the axial direction in the divided state.

The wall part 122 of the insulator 12 is located at the outer periphery side of the substrate 2 in an assembled state with the substrate 2 assembled to the stator 3. As viewed from the radial direction, the wall part 122 is formed in a substantially rectangular shape, and is protruded from the yoke 11b in the axial direction. In addition, in the present embodiment, a recess part 122A recessed in the axial direction and a tilted surface 122B tilted at a predetermined angle with respect to the axial direction are formed in the wall part 122, as illustrated in FIG. 5.

Next, an operation of forming the coil 30 by winding the conducting wire 14 around the insulator 12 in the present embodiment will be described. The coil 30 is wound clockwise or counterclockwise around the tooth 11a of the stator core 11 via the housing part 121 of the insulator 12 so as to surround the top surface 123 and the side surface 125 of the insulator 12. The coil 30 of the present embodiment is a so-called concentrated winding coil wound around one stator core 11, for example. In addition, the conducting wire 14 of the present embodiment is a circular wire made of copper, for example.

As illustrated in FIG. 6 to FIG. 8, the coil 30 includes a first layer 31, and a second layer 32 overlaid on the first layer 31 in the axial direction. In the case of winding the conducting wire 14 around the insulator 12, the first layer 31 of the coil 30 is wound around the top surface 123. In this case, a plurality of conducting wires 1n forming the first layer 31 of the coil 30 are wound in contact with each other in the radial direction as illustrated in FIG. 7 and FIG. 8, for example. In addition, in the present embodiment, the conducting wire 1n is wound inward in the radial direction, the winding starting from a conducting wire 1o of the first layer toward a conducting wire 1i of the first layer, the conducting wire 1o of the first layer making up an outer edge oE of the coil 30 in the radial direction and the conducting wire 1i of the first layer making up an inner edge iE of the coil 30 in the radial direction.

Next, the conducting wire is wound at the outside in the axial direction from the conducting wire 1i of the first layer, so that a second layer of the coil 30 is formed. In this case, as illustrated in FIG. 7, a conducting wire 2i of the second layer and the conducting wire 1i of the first layer making up the inner edge iE of the coil 30 contact each other.

Then, a conducting wire 2n forming the second layer of the coil 30 is wound outward in the radial direction from the conducting wire 2i toward a conducting wire 2o of the second layer forming the outer edge oE of the coil 30. In this case, as illustrated in FIG. 7, the conducting wire 2o of the second layer and the conducting wire 1o of the first layer making up the outer edge oE of the coil 30 contact each other.

In the present embodiment, for example, an end part I2 of the conducting wire 2i at the inside in the radial direction is located at the outer edge oE side, i.e., the outside in the radial direction, relative to an end part I1 of the conducting wire 1i at the inside in the radial direction as illustrated in FIG. 6 and FIG. 7. Likewise, an end part O2 of the conducting wire 2o at the outside in the radial direction is located at the inner edge iE side, i.e., the inside in the radial direction, relative to an end part O1 of the conducting wire 1o at the outside in the radial direction. In this case, the number of turns of the conducting wire 2n making up the second layer 32 is smaller than the number of turns of the conducting wire 1n making up the first layer 31, for example. More specifically, a number of turns T2 of the conducting wire 2n is equal to or smaller by 1 than a number of turns T1 of the conducting wire 1n.

In addition, in the present embodiment, a length T in the radial direction from the conducting wire 2i at the inner edge side to the conducting wire 2o at the outer edge side of the conducting wire 2n making up the second layer is smaller than a length S in the radial direction from the inner periphery side to the outer periphery side of the substrate 2 as illustrated in FIG. 7.

In addition, in top view, the entirety of the coil 30 of the present embodiment is located inside the extension lines of the yoke 11b of the stator core 11 in the circumferential direction. For example, as illustrated in FIG. 6, the second layer 32 at the outermost layer of the coil 30 is located at a side closer to the stator core 11 in the circumferential direction than extension lines Xa and Xb of end surfaces Ea and Eb of the yoke 11b of the stator core 11 in the circumferential direction. In such a configuration, as illustrated in FIG. 8, gaps G1 and G2 are formed between the coils 30 of the split cores 10 adjacent to each other in the circumferential direction. In addition, in the present embodiment, as illustrated in FIG. 6, the outer edge oE of the coil 30 is located at the inside relative to a tilted part B1 of the insulator 12 in the radial direction.

In addition, in the present embodiment, the length (thickness) L of the stator core 11 in the axial direction is greater than the sum of lengths (the thickness of the coil end part) Ta and Tb of the coil 30 in the axial direction as illustrated in FIG. 7. Note that in the present embodiment, the thickness L of the stator core 11 is greater than a thickness obtained by further adding thicknesses Tx and Ty of the insulator 12 in the axial direction, to Ta and Tb.

In this case, the second layer 32 of the coil 30 is a layer remotest from the stator core 11 in the axial direction and the circumferential direction. The height of the stator is reduced by reducing the number of turns of the coil.

Figure 9:
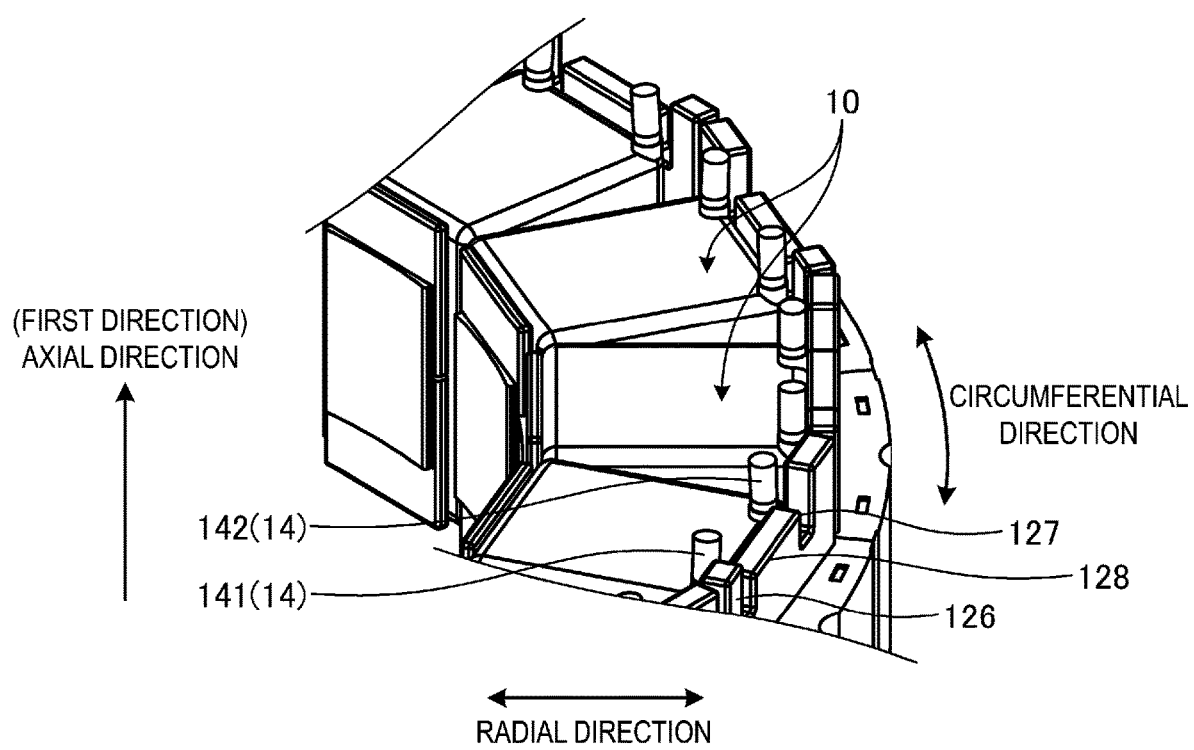
FIG. 9 is a perspective view illustrating an example of the stator of the embodiment.
Figure 10:
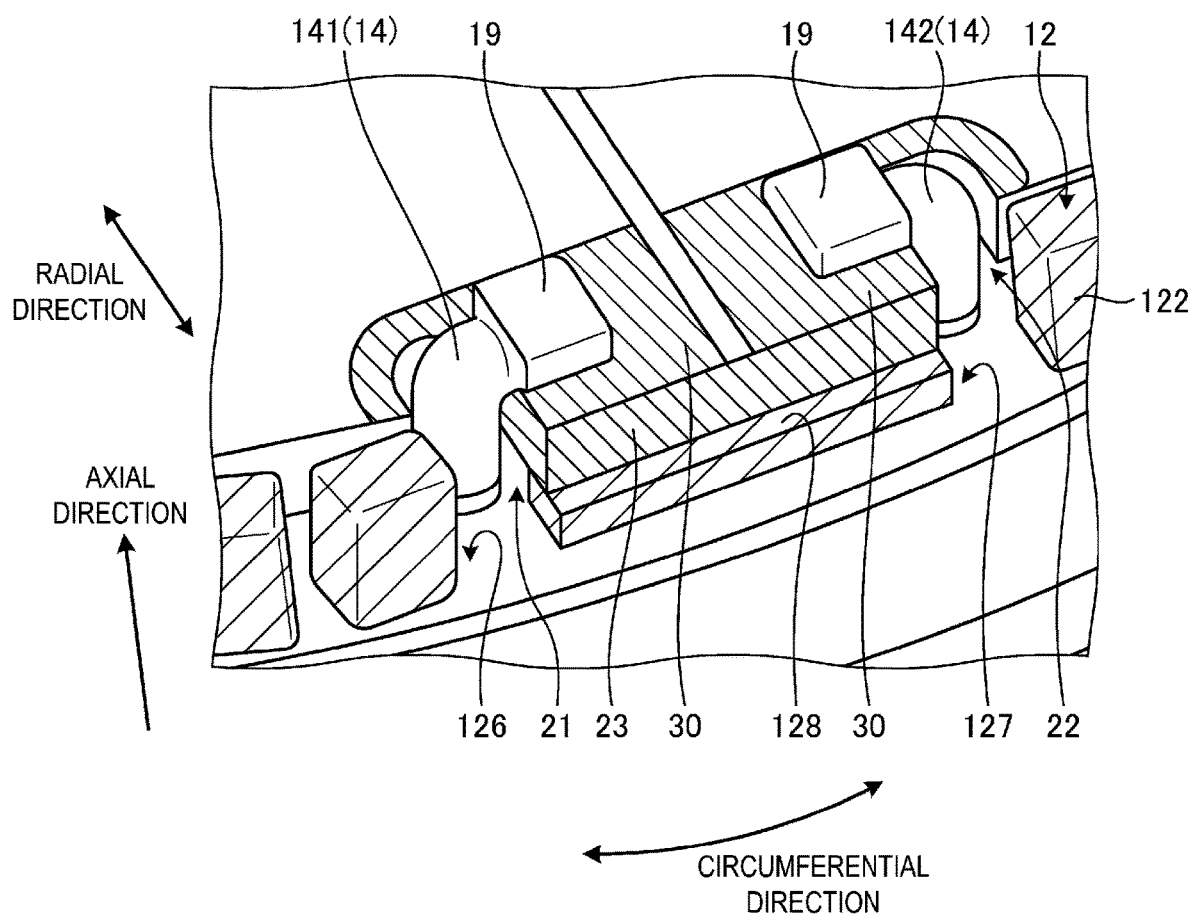
FIG. 10 is an enlarged perspective view illustrating an example of a connecting part of the embodiment.

Next, an operation of drawing and assembling the first end part 141 and the second end part 142 of the conducting wire 14 being the draw wire drawn from the coil 30 of the present embodiment to the substrate side first recess part 21 and the substrate side second recess part 22 will be described with reference to FIG. 9 and FIG. 10. FIG. 9 is a perspective view illustrating an example of the stator of the embodiment. FIG. 10 is an enlarged perspective view illustrating an example of a connecting part of the embodiment. In the present embodiment, the first end part 141 of the coil 30 is drawn from the conducting wire 2o at the outer edge side of the second layer 32 of the coil 30 illustrated in FIG. 7, and the second end part 142 of the coil 30 is drawn from the conducting wire 1o at the outer edge side of the first layer 31 of the coil 30. In the present embodiment, each of the first end part 141 and the second end part 142 is drawn from the outer peripheral side of the coil 30 in the radial direction as illustrated in FIG. 9.

The first end part 141 and the second end part 142 of the conducting wire 14 drawn in the first direction are connected to the land 29 of the substrate 2 as illustrated in FIG. 10. At this time, the first end part 141 and the second end part 142 are tilted toward the tilted surface 122B side illustrated in FIG. 5, i.e., the outside in the radial direction, and escape toward the recess part 122A along the tilted surface 122B, for example.

As illustrated in FIG. 10, the first end part 141 being one end part of the conducting wire 14 drawn from the coil 30 is passed through the substrate side first recess part 21, in the assembled state with the substrate 2 assembled to the stator 3. As illustrated in FIG. 10, the second end part 142 being the other end part of the conducting wire 14 drawn from the coil 30 is passed through the substrate side second recess part 22, in the assembled state with the substrate 2 assembled to the stator 3.

The first end part 141 of the conducting wire 14 is located at the inside of the substrate side first recess part 21 and the second end part 142 is located at the inside of the substrate side second recess part 22, in the assembled state with the substrate 2 assembled to the stator 3. The first end part 141 and the second end part 142 are disposed and oriented to oppose each other in the circumferential direction. The first end part 141 and the second end part 142 sandwich the substrate protrusion part 23 between the substrate side first recess part 21 and the substrate side second recess part 22 in the circumferential direction. As illustrated in FIG. 10, the first end part 141 and the second end part 142 are joined to the land 29 of the substrate 2 by, for example, the solder 19, with the substrate protrusion part 23 between the substrate side first recess part 21 and the substrate side second recess part 22 sandwiched between the first end part 141 and the second end part 142 in the circumferential direction.

In the present embodiment, the first end part 141 of the conducting wire 14 and another coil 30 wound around another split core 10 are electrically connected through the substrate 2. In this case, the draw wire drawn from another coil 30 and the first end part 141 do not intersect each other. Thus, the space for intersecting the draw wires does not need to be left, and thus the axial length of the motor 1 can be reduced.

The first layer 31 and the second layer 32 of the coil 30 are wound such that the cross-sectional shape of the coil 30 illustrated in FIG. 6 is within a substantially rectangular frame. Note that when the number of turns T2 of the conducting wire 2n of the second layer 32 is smaller than the number of turns T1 of the conducting wire 1n of the first layer 31, the cross-sectional shape of the coil 30 is within a substantially trapezoidal frame, and the length of the second layer 32 in the radial direction is slightly smaller than the length of the first layer 31. In both cases, in the axial direction, the outer shape of the coil 30 formed by the second layer 32 (the outside in the axial direction) of the coil 30 does not have a part protruding from the substantially rectangular or substantially trapezoidal frame.

In the present embodiment, after the first layer 31 is wound from the conducting wire 1o at the outer edge side to the conducting wire 1i at the inner edge side, the second layer 32 of the coil 30 is wound starting from a part located at the circumferential direction side in the conducting wire 2i at the inner edge side of the coil 30. That is, the winding start of the second layer 32 is formed at an end part at the circumferential direction side at the inner edge iE of the coil 30. Also in this case, a gap G2 is left between the inner edges of the two coils 30 adjacent to each other in the circumferential direction, and thus the interference with the other adjacent coil 30 in the circumferential direction can be suppressed. In addition, the collapse of the winding of the coil 30 can be suppressed and the axial length of the motor can be reduced compared with the case of starting the winding of the second layer 32 at the end part at the axial direction side of the coil 30.

As described above, the motor 1 of the present embodiment includes the stator 3 and the substrate 2. The stator 3 includes the plurality of magnetic bodies 11 disposed side by side in the circumferential direction, and the coil 30 wound around each of the plurality of magnetic bodies 11. The substrate 2 opposes the stator 3 in the rotational axis direction. The coil 30 includes the first layer 31 and the second layer 32 stacked on the first layer 31. $1 \leq D/L$ holds, where L is the thickness of the magnetic body 11 in the rotational axis direction and D is the width of the magnetic body 11 in the radial direction. The second layer 32 is a layer remotest from the magnetic body 11. The conducting wire 1i of the first layer 31 and the conducting wire 2i of the second layer 32 making up the inner edge iE of the coil 30 are in contact with each other in the radial direction, and the conducting wire 1o of the first layer 31 and the conducting wire 2o of the second layer 32 making up the outer edge oE of the coil 30 are in contact with each other in the radial direction. With this configuration, the length of the motor 1 in the axial direction can be reduced.

In addition, in the motor 1, the conducting wire 2i of the second layer 32 making up the inner edge iE is located at the outer edge oE side in the radial direction relative to the conducting wire 1i of the first layer 31 making up the inner edge iE, and the conducting wire 2o of the second layer 32 making up the outer edge oE is located at the inner edge iE side in the radial direction relative to the conducting wire 1o of the first layer 31 making up the outer edge oE. In addition, in the motor 1, the conducting wires 1n form the first layer 31 are in contact with each other in the radial direction, the conducting wires 1n forming the first layer 31 being adjacent to each other in the radial direction, and the conducting wires 2n forming the second layer 32 are in contact with each other in the radial direction, the conducting wires 2n forming the second layer 32 are adjacent to each other in the radial direction. In addition, the drawing position of the draw wire 14 drawn from the coil 30 is the outer edge oE of the coil 30. Further, at the coil 30 of the motor 1, the winding start of the second layer 32 is formed at an end part of the conducting wire 2i of the second layer 32 making up the inner edge iE of the coil 30, in the circumferential direction of the coil 30. With this configuration, the collapse of the winding of the coil 30 can be suppressed while the occupancy ratio of the coil 30 is enhanced.

In addition, in the motor 1, the entirety of the coil 30 is located at the magnetic body 11 side in the circumferential direction relative to the extension lines X1 and X2 of the end surfaces Ea and Eb of the outer periphery part 11b of the magnetic body 11. In this case, a gap is formed in the circumferential direction between the coils 30 wound around respective two magnetic bodies 11 adjacent to each other in the circumferential direction among the plurality of magnetic bodies 11. In addition, in the radial direction, the ratio of the length T from the conducting wire 2i at the inner edge side to the conducting wire 2o at the outer edge side of the second layer 32 with respect to the length S from the inner periphery part to the outer periphery part of the substrate 2 is within a range of 50% to 90%. With this configuration, with the gaps G1 and G2 provided as illustrated in FIG. 8, the two coils 30 adjacent to each other in the circumferential direction interfere with each other, and reduction of the circularity of the stator 3 can be suppressed. In addition, with the gaps G1 and G2 left, winding heat dissipation of the coil 30 by air cooling is improved, and the choice of resins can be expanded without being limited by viscosity when using resins such as molds and varnishes to enhance heat dissipation.

In addition, the motor 1 includes the rotor 80 with the thickness L2 equal to or greater than the thickness L of the magnetic body 11 in the rotational axis direction, and the sensor 91 disposed to oppose the rotor 80 in the rotational axis direction. In the rotational axis direction, the sensor located at a height P2 is located at the rotor 80 side, i.e., the negative side in the rotational axis direction, relative to the substrate located at a height P1. The draw wire 14 is drawn through the recess parts 21 and 22 formed at the outer periphery part of the substrate 2. The draw wire 14 and a draw wire 14 drawn from another coil 30 are electrically connected to each other through the substrate 2. With this configuration, with the recess parts 21 and 22 formed at the substrate 2, the connection region of the draw wire 14 and the substrate 2 can be left and the distance between the substrate 2 and the stator 3 can be reduced, and thus, the length of the motor 1 in the axial direction can be reduced. In addition, since the sensor 91 can be brought closer to the rotor magnet 81, the detection accuracy of the magnetic flux at the sensor 91 can be improved. Further, by setting the thickness L2 of the rotor 80 to a thickness greater than the thickness L of the stator core 11, the demagnetization due to interference between the magnetic flux of the stator 3 and the magnetic flux of the rotor 80 less occurs.

In addition, in the motor 1, the thickness L of the magnetic body 11 in the axial direction is greater than the sum of the thicknesses Ta and Tb of the coil 30 in the axial direction. With this configuration, even in the motor 1 being a flat motor, the number (stack length) of stator cores can be increased, and thus generation of saturation of the magnetic flux can be suppressed, and, the torque can be increased.

The configurations of the present embodiment has been described above, but the embodiment is not limited to these configurations. For example, the motor 1 is not limited to the brushless motor. In addition, the conducting wire 14 may be further wound at a position further inside the first layer 31 of the coil 30 in the axial direction, i.e., a position close to the stator core 11.

In addition, as illustrated in FIG. 2, FIG. 9, and FIG. 10, at the wall part 122 of the insulator 12, the two recess parts 126 and 127 and a protrusion part 128 located between two recess parts may be formed. In this case, in the radial direction, the two recess parts 126 and 127 oppose the respective drawing positions of the two conducting wires 14 from the coil 30. In addition, the end part of the protrusion part 128 is formed to have a lower height in the axial direction than a height of the end part of the wall part 122 in the first direction (the end part of the protrusion part 128 is located at the negative side in the axial direction). In addition, in the configuration illustrated in FIG. 9 and FIG. 10, the first end part 141 and the second end part 142 may tilt outward in the radial direction to escape into the recess parts 126 and 127.

Further, while the conducting wire 14 forming the coil 30 is composed of a single copper circular wire, the conducting wire 14 is not limited to this wire, and the conducting wire 14 may be composed of a plurality of circular wires. In this case, it suffices that any of a plurality of circular wires making up the conducting wires 14 adjacent to each other is in contact with any of a plurality of circular wires making up other conducting wires 14. In addition, the conducting wire 14 with a different shape such as a rectangular wire may be used instead of the circular wire made of copper.

Embodiments and modified examples of the present invention have been described, but the present invention is not limited to the embodiments and modified examples, and various modifications are possible without departing from the spirit of the present invention. Various modifications within a scope not departing from the gist are included in the technical scope of the present invention, and this is obvious to a person having skill in the art from the description of the claims.

REFERENCE SIGNS LIST

1 Motor, 2 Substrate, 3 Stator, 10 Split core, 11 Stator core, 11a Tooth, 11b Yoke, 12 Insulator, 14 Conducting wire, 19 Solder, 2a , 2b Surface, 21 Substrate side first recess part, 22 Substrate side second recess part, 29 Land, 30 Coil, 31 First layer, 32 Second layer, 80 Rotor, 81 Rotor magnet, 82 Rotor core, 90 Lid part (housing), 91 Sensor, 92 Sensor holder, 121 Housing part, 122 Wall part, 123 Top surface, 125 Side surface

The invention claimed is:

1. A motor comprising:
a stator including a plurality of magnetic bodies disposed side by side in a circumferential direction and a coil wound around each of the plurality of magnetic bodies and an insulator;
a rotor including a thickness equal to or greater than a thickness of the magnetic body in a rotational axis direction;
a sensor disposed to oppose the rotor in the rotational axis direction;
a substrate opposing the stator in a rotational axis direction, and
a housing including the sensor, wherein
the coil includes a first layer and a second layer stacked on the first layer;
the rotor is disposed inside the stator,
the housing accommodates the rotor and the stator and the substrate,
$1 \leq D/L$ holds, where L is a thickness of the magnetic body in the rotational axis direction and D is a width of the magnetic body in a radial direction;
the second layer is a layer outermost from the magnetic body in the rotational axis direction and in the circumferential direction;
in the radial direction, a conducting wire of the first layer and a conducting wire of the second layer making up an inner edge of the coil are in contact with each other;
in the radial direction, a conducting wire of the first layer and a conducting wire of the second layer making up an outer edge of the coil are in contact with each other,
the sensor is located at a side of the rotor relative to the substrate in the rotational axis direction, and
the thickness of the magnetic body in the rotational axis direction is greater than a thickness of the coil and the insulator in the rotational axis direction,
wherein a ratio of a length from an inner edge to an outer edge of the second layer with respect to a length from an inner periphery part to an outer periphery part of the substrate in the radial direction is within a range of 50% to 90%.

2. The motor according to claim 1, wherein
the conducting wire of the second layer making up the inner edge is located at the outer edge side in the radial direction relative to the conducting wire of the first layer making up the inner edge; and the conducting wire of the second layer making up the outer edge is located at the inner edge side in the radial direction relative to the conducting wire of the first layer making up the outer edge.

3. The motor according to claim 1, wherein conducting wires forming the first layer are in contact with each other in the radial direction, the conducting wires forming the first layer being adjacent to each other in the radial direction; and conducting wires forming the second layer are in contact with each other in the radial direction, the conducting wires forming the second layer being adjacent to each other in the radial direction.

4. The motor according to claim 1, wherein relative to an extension line of an end surface of an outer periphery part of the magnetic body, an entirety of the second layer is located at a side of a part of the magnetic body wound around with the coil.

5. The motor according to claim 1, wherein a gap is provided between the coils wound around respective two magnetic bodies adjacent to each other in the circumferential direction among the plurality of magnetic bodies.

6. The motor according to claim 1, wherein a drawing position of a draw wire drawn from the coil is an outer edge of the coil.

7. The motor according to claim 6, wherein the draw wire is drawn through a recess part formed at an outer periphery part of the substrate.

8. The motor according to claim 6, wherein the draw wire and a draw wire drawn from another of the coils are electrically connected to each other through the substrate.

9. The motor according to claim 1, wherein a first layer of the coil is wound starting from the outer edge of the coil toward an inner edge side direction of the coil; and a winding start of the second layer of the coil is formed at an end part in the circumferential direction of the coil in the conducting wire of the second layer making up the inner edge of the coil.

* * * * *